US012790885B2

(12) United States Patent
Beswick et al.

(10) Patent No.: US 12,790,885 B2
(45) **Date of Patent: *Nov. 10, 2026**

(54) COMPACT POCKET DOOR FRAME ASSEMBLY

(71) Applicant: BEYOND THE GRAIN, LLC, Southwest Ranches, FL (US)

(72) Inventors: Dale Beswick, Southwest Ranches, FL (US); Kevin Cost, Southwest Ranches, FL (US)

(73) Assignee: Beyond The Grain, LLC, Southwest Ranches, FL (US)

( * ) Notice: Subject to any disclaimer, the term of this patent is extended or adjusted under 35 U.S.C. 154(b) by 165 days.

This patent is subject to a terminal disclaimer.

(21) Appl. No.: 18/437,774

(22) Filed: Feb. 9, 2024

(65) Prior Publication Data

US 2024/0183215 A1 Jun. 6, 2024

Related U.S. Application Data

(63) Continuation-in-part of application No. 18/470,056, filed on Sep. 19, 2023, now Pat. No. 12,546,161.

(60) Provisional application No. 63/382,911, filed on Nov. 9, 2022.

(51) Int. Cl.
*E06B 3/46* (2006.01)
*E05D 15/06* (2006.01)

(52) U.S. Cl.
CPC ........ *E06B 3/4654* (2013.01); *E05D 15/0652* (2013.01); *E05Y 2600/51* (2013.01)

(58) Field of Classification Search
CPC ..... E06B 3/4654; E06B 1/52; E05D 15/0652; E05Y 2600/51
See application file for complete search history.

(56) References Cited

U.S. PATENT DOCUMENTS 834,649 A * 10/1906 Williams .............. E06B 3/4654 16/DIG. 31
1,221,766 A * 4/1917 Pitcher .................. E06B 3/4654 49/411
1,267,415 A * 5/1918 Huckestein ........... E06B 3/4654 49/380

(Continued)

FOREIGN PATENT DOCUMENTS

DE 9111066 U1 * 9/1991
DE 0505614 B1 * 6/1996 ........... E06B 3/4654

(Continued)

*Primary Examiner* — Brian E Glessner
(74) *Attorney, Agent, or Firm* — McHale & Slavin, P.A.

(57) ABSTRACT

An improved compact pocket door frame for a sliding door. The frame employs a header support having an overhead track attached by T-nuts. A pair of vertical spreaders form a pocket recess entrance. A header spacer is positioned perpendicular to a lower surface of the header support and extends outwardly from the pocket recess. A header frame member is positioned perpendicular to each header spacer and extends outwardly from the pocket recess. The pocket door frame is constructed and arranged to provide dimensional stability and prevent warping or twisting. The header support is removably fastened to the vertical spreaders for shipping and storage whereby the header support is secured to the vertical spreaders forming a T-shape structure for wall mounting to support a sliding door.

20 Claims, 7 Drawing Sheets

(56) References Cited

U.S. PATENT DOCUMENTS

| | | | | | |
|---|---|---|---|---|---|
| 2,378,666 | A * | 6/1945 | Triller | E06B 3/4654 16/95 W |
| 2,632,925 | A * | 3/1953 | Long | E06B 3/4654 16/92 |
| 2,857,629 | A * | 10/1958 | Walter | E06B 3/4654 52/211 |
| 3,058,174 | A * | 10/1962 | Sterling | E06B 3/4654 49/410 |
| 4,742,645 | A * | 5/1988 | Johnston | E06B 3/4654 49/504 |
| 10,648,221 | B2 * | 5/2020 | Liu | E06B 3/4654 |
| 10,883,304 | B2 * | 1/2021 | Monaghan | E06B 3/4636 |
| 2014/0075863 | A1 * | 3/2014 | Laronde | E06B 3/4654 52/217 |

FOREIGN PATENT DOCUMENTS

| | | | | |
|---|---|---|---|---|
| EP | 1681428 | A1 * | 7/2006 | E06B 3/4654 |
| FR | 2545144 | A1 * | 11/1984 | E06B 3/4654 |
| FR | 2745601 | A1 * | 9/1997 | E06B 3/4654 |
| WO | WO-2008003117 | A1 * | 1/2008 | E06B 3/4654 |

* cited by examiner

COMPACT POCKET DOOR FRAME ASSEMBLY

PRIORITY CLAIM

In accordance with 37 C.F.R. 1.76, a claim of priority is included in an Application Data filed concurrently herewith. Accordingly, the present invention claims priority as a continuation-in-part of U.S. patent application Ser. No. 18/470,056, entitled "POCKET DOOR FRAME ASSEMBLY", filed Sep. 19, 2023, which claims priority to U.S. Provisional Patent Application No. 63/382,911, entitled "POCKET DOOR FRAME ASSEMBLY", filed Nov. 9, 2022. The contents of the above referenced applications are incorporated herein by reference in its entirety.

FIELD OF THE INVENTION

The invention is directed to pocket doors used in residential and commercial properties and, in particular, to a pocket door frame assembly having a modular construction, allowing compact storage and shipping, and effortlessly assembly providing spacing advantages over conventional pock door frames.

BACKGROUND OF THE INVENTION

A "pocket door" is commonly used in homes and offices to provide a unique space saving feature. Pocket doors can be hidden in a wall by use of a recessed compartment placed in a wall cavity. In modern home and building construction, partition walls are normally constructed from wood studwork covered with a wall skin, such as drywall, sheetrock, plasterboard or the like. The pocket door design requires a builder to leave space in the studwork for a doorway and also for an internal cavity into which a sliding door may be concealed. For this reason, typical pocket door frames include studwork for support of the wall skin. The door frame supports the outer skin of the wall providing wall strength, and providing a frame for the sliding door to travel within. The result is very good space saving characteristics and a contemporary design, as there is no encroachment of a conventional hinged door into the adjoining room. Modern designers realize this and, as a result, pocket doors have made a resurgence in recent years.

However, conventional pocket door frames are known to sag or outright fail over time due to inadequate construction design. The conventional frame relies upon a substandard support for the wall skin which will eventually allow warpage as the frame ages. The conventional frame employs a minimal amount of structural rigidity by relying upon adjacent wall panels for support. Further, conventional framing can be installed improperly, or damaged during installation, due to the required reliance on adjacent wall boards to provide reinforcement. Additionally, the framing can warp over time due to acclimation such as wood and wall board strength variation due to moisture affecting rigidity. Aluminum U-shaped channels were added in an attempt to correct the problem, but the channels can easily be damaged and relying upon adjacent wall boards for strength result in the same failures. Conventional pocket door frames use nails as fasteners which fail to permanently bond members together.

In light of the above, conventional pocket door frames eventually fail resulting in the pocket door rubbing on the frame and making it difficult to open or close. Once the framing for a pocket door fails the frame needs to be replaced, which is complicated task as part of the wall has to be opened. Due to the failure of conventional pocket door, the reputation of pocket doors has soured.

Conventional pocket door frames typically have oversized dimensions leading to a substantial rise in packaging and shipping costs. The excessively large pocket door frames pose logistical challenges as manufacturers are compelled to invest more resources in crafting packaging materials that can adequately accommodate these bulkier dimensions. Consequently, the increased size not only escalates the expenses associated with packaging materials but also necessitates larger shipping containers, resulting in elevated transportation costs. Addressing the challenge of oversized pocket door frames is pivotal for optimizing efficiency, cost-effectiveness, and sustainability within the industry.

To address the above mentioned shortcomings, Applicants co-pending patent application Ser. No. 18/470,056 provides an improved Pocket Door Frame Assembly, the contents of which is incorporated herein by reference. However, in instances where storage and shipping concerns require minimal space, there exists a need for a compact door frame assembly having a construction technique to address and eliminate pocket door frame warping frame while reducing the cost of materials and shipping.

SUMMARY OF THE INVENTION

Disclosed is a compact pocket door frame featuring a modular construction, allowing it to stored or shipped using compact packaging. The modular construction streamlines the packaging process and significantly reduces the overall dimensions of the shipped product. The user-friendly assembly enables a straightforward and efficient installation on-site, ensuring that the pocket door frame maintains structural integrity while minimizing packaging and shipping expenses. Such a solution not only addresses the logistical challenges faced by manufacturers but also enhances convenience for both distributors and end-users, ultimately fostering a more cost-effective and environmentally sustainable approach to pocket door frame transportation.

The pocket door frame includes a header support having a first end and a second end; first and second header spacers having a proximal end and a distal end, the header spacers secured to said header support and extending along the length of the header support; first and second header frame members secured to the first and second header spacers; a track fastened to a lower surface of the header support and nested between the first and second header spacers and the first and second header frame members, the track constructed and arranged to support a sliding door movable between a first and second end of said header support; a first vertical spreader spaced apart from a second vertical spreader by a first distance, each of the spreaders removably fastened, and extending from, the header support, and secured perpendicular to the proximal end of the header spacers; a base member having a having a front end and a back end forming a second length therebetween, the front end fastened to the first and second vertical spreader forming an opening sized to allow a sliding door to pass through the opening; a metal endplate attached to the second end of the header support, the metal endplate having a width measured between a first edge wall and a second edge wall; a first plywood panel positioned adjacent the first vertical spreader and extending from the base member to said header support and removably fastened to the header support; a first base block extending between the base member and the header support, the first base block secured to the first vertical spreader; a second plywood panel positioned adjacent the second vertical spreader and extending from the base member to the header support and removably fastened to the header support; a second base block extending between the base member and the header support, the second base block secured to the second vertical spreader; wherein the header support is removably fastened to the vertical spreaders for shipping and storage whereby said header support is secured to the vertical spreaders forming a T-shape structure for wall mounting to support a sliding door.

An objective of the invention is to provide an improved compact pocket door frame assembly that allows a header support shaped and sized to the width of vertical spreaders to fit together as one compact unit in order for the frame assembly to be packaged neatly in a vertical container.

Another objective of the invention is to provide an improved compact pocket door frame assembly using primed finger joint pine and plywood leading to long term dimensional stability.

Still another objective of the invention is to employ a header that is easily disassembled in order to reduce the size of packaging to lower shipping costs.

Yet still another objective of the invention is to provide a header with T-nuts, allowing ease of track installation and replacement.

Another objective of the invention is to use a proximal end of a header spacer attached to the header support as a proper fitting guide during installation, ensuring no side to side movement of the track.

Still another objective of the invention is to eliminate the need for a metal typically used for stability in a conventional frame.

Other objectives and advantages of this invention will from the following description become apparent taken in conjunction with any accompanying drawings wherein are set forth, by way of illustration and example, certain embodiments of this invention. Any drawings contained herein constitute a part of this specification, include exemplary embodiments of the present invention, and illustrate various objects and features thereof.

DETAILED DESCRIPTION OF THE PREFERRED EMBODIMENT

Figure 1:
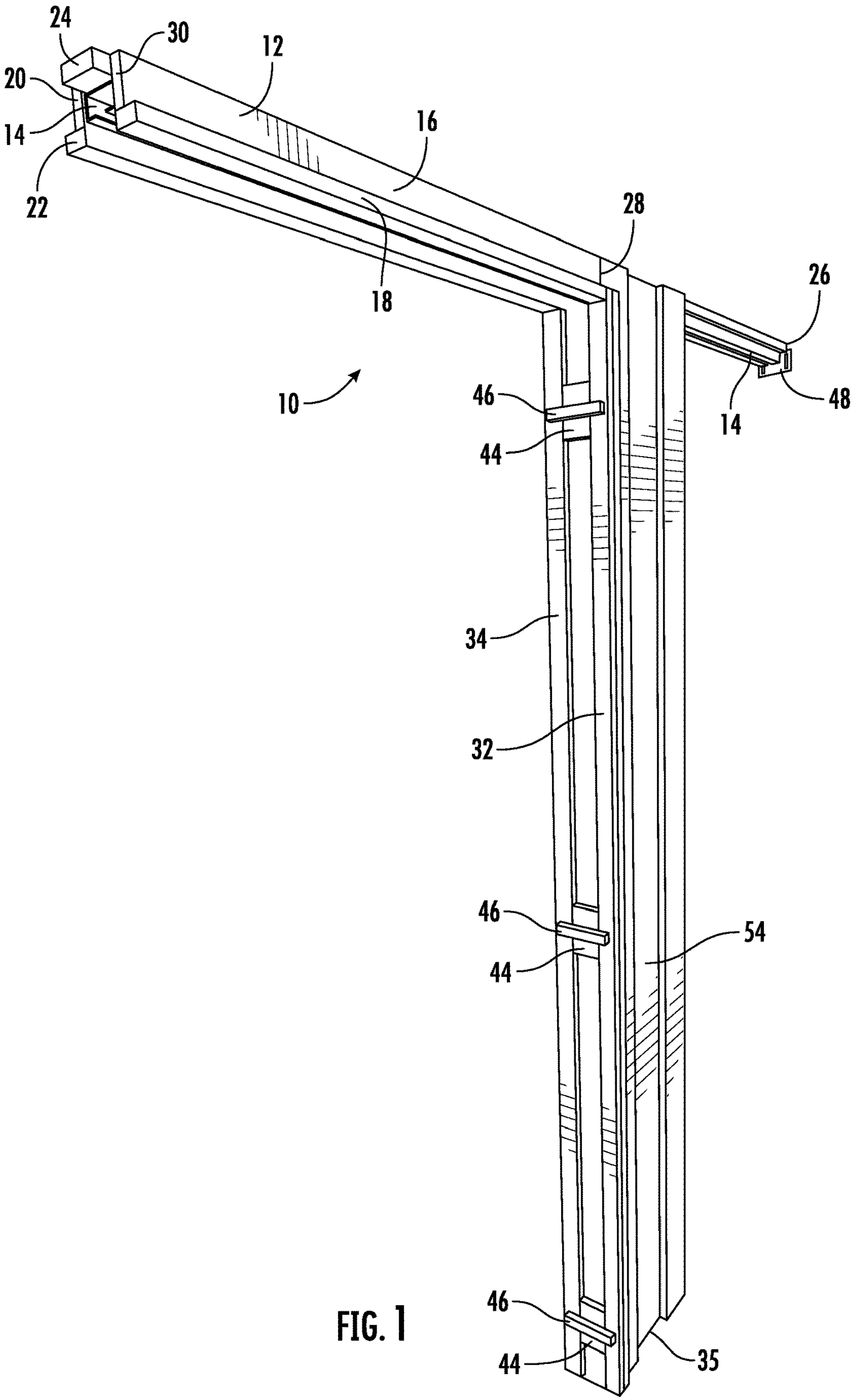
FIG. 1 is a perspective view of a compact pocket door frame assembly.
Figure 2:
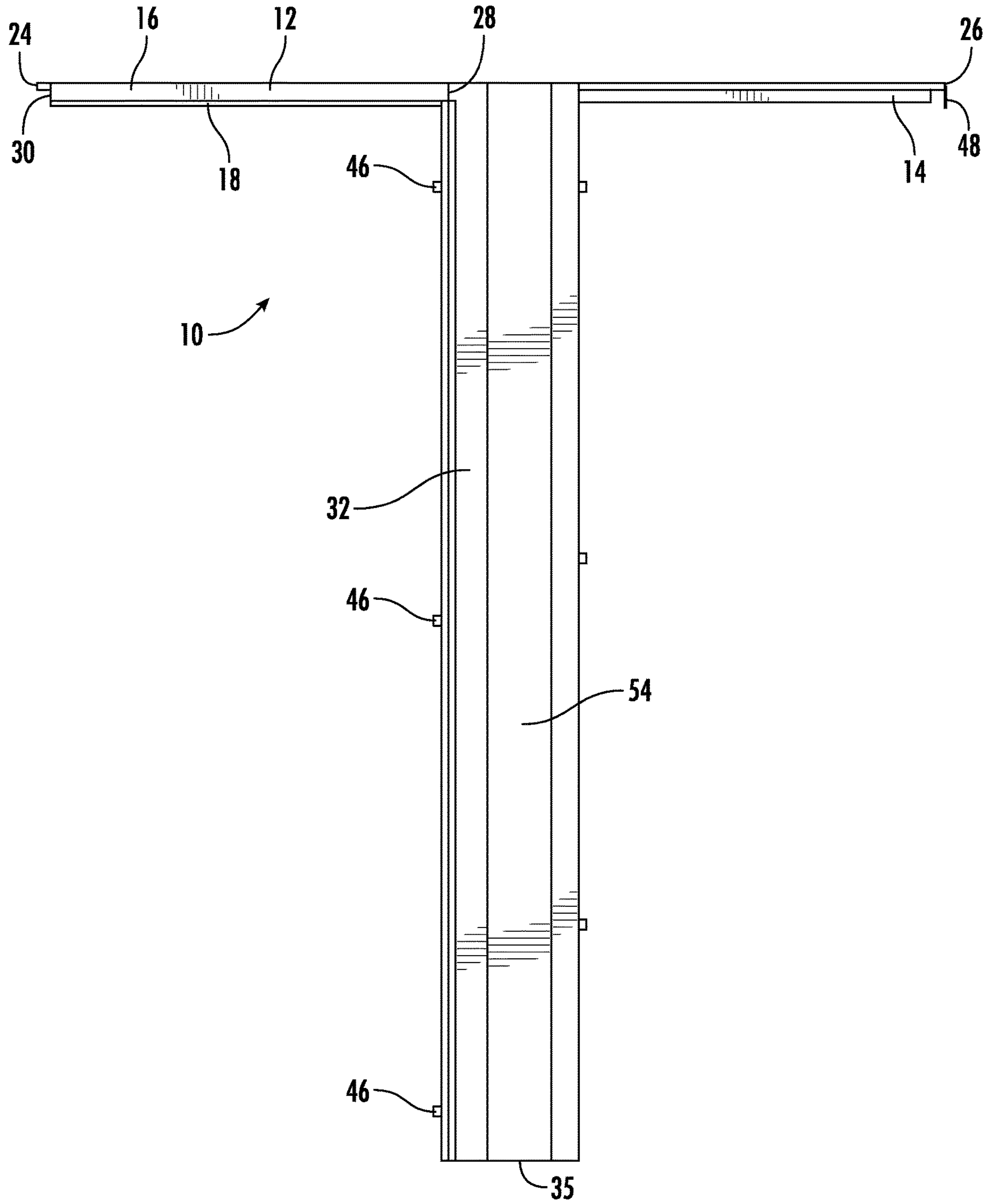
FIG. 2 is a side view thereof.

A detailed embodiment of the instant invention is disclosed herein; however, it is to be understood that the disclosed embodiment is merely exemplary of the invention. Therefore, specific functional and structural details disclosed herein are not to be interpreted as limiting, but merely as a basis for the claims and as a representation basis for teaching one skilled in the art to variously employ the present invention in virtually any appropriately detailed structure.

Referring now to the figures, illustrated is a compact pocket door frame 10 for a sliding door hung from a header support 12 having a length (L1) and a width (W1). The header support 12 spans from a first end 24 to a second end 26. A track 14 is attached to the header support 12 by use of a plurality of T-bolts 15 wherein a reciprocal fastener is removably attached to each T-bolt 15, allowing ease of track 14 maintenance or replacement.

A first header spacer 16 is positioned perpendicular to a lower surface of the header support 12 and extends outwardly from the pocket recess. A first header frame member 18 is positioned perpendicular to the first header spacer 16 and extends outwardly from the pocket recess. The first header spacer 16 is stapled and glued to the header support 12. The first header frame member 18 is stapled and glued to the first header spacer 16. A second header spacer 20 is positioned perpendicular to a lower surface of the header support 12 and extends outwardly from the pocket recess. A second header frame member 22 is positioned perpendicular to the second header spacer 20 and extends outwardly from the pocket recess. The second header spacer 20 is stapled and glued to the header support 12. The second header frame member 22 is stapled and glued to the second header spacer 20.

The track 14 is nested between the first and second header spacers 16, 20 and the first and second header frame members 18, 22. This region is referred to as the "pocket recess". In a preferred embodiment, the pocket recess has a width of at least 4⅝ inches.

The first header spacer 16 and the first header frame member 18 attached thereto extend from a proximal end 28 to a distal end 30. In a preferred embodiment, the proximal end 28 is located close to the middle point of the header support 12, but the distance between the distal end 30 and the proximal end 28 may span any distance shorter than the distance between the first end 24 and the second end 26. During installation of the compact pocket door frame assembly 10, the proximal end 28 is used as a stopper to ensure no side to side movement of the track.

A first vertical spreader 32 and a second vertical spreader 34 extend from a base member 35 to the header support 12 in a spaced apart position. The first vertical spreader 32 is spaced apart from the second vertical spreader 34 by a first distance and each spreader 32, 34 is removably fastened and extending from the header support 12 and secured perpendicular to the proximal end 28 of said header spacers 16, 20. In a preferred embodiment, the base member 35 is made of ⅛ inch Polyethylene for reduced friction, damage prevention, corrosion resistance, low cost, and ease of installation. In this embodiment, the base member 35 has a thickness of ⅛ inch and a length of 14¾ inch.

Each vertical spreader 32, 34 is made from laminated 3% inch primed finger joint pine and is stapled and glued to the header support 12 forming a spaced apart opening of about 2¼ inches (W1). The first vertical spreader 32 forms an "L" shape by use of a laminated base block 36 forming a width (W2) of about 1½ inches with the base block 36 glued and stapled to the vertical spreader 32. Similarly, the second vertical spreader 34 forms an "L" shape by use of a laminated second base block 38 forming a width (W3) of about 1½ inches with the second base block 38 glued and stapled to the second vertical spreader 34.

Figure 3:
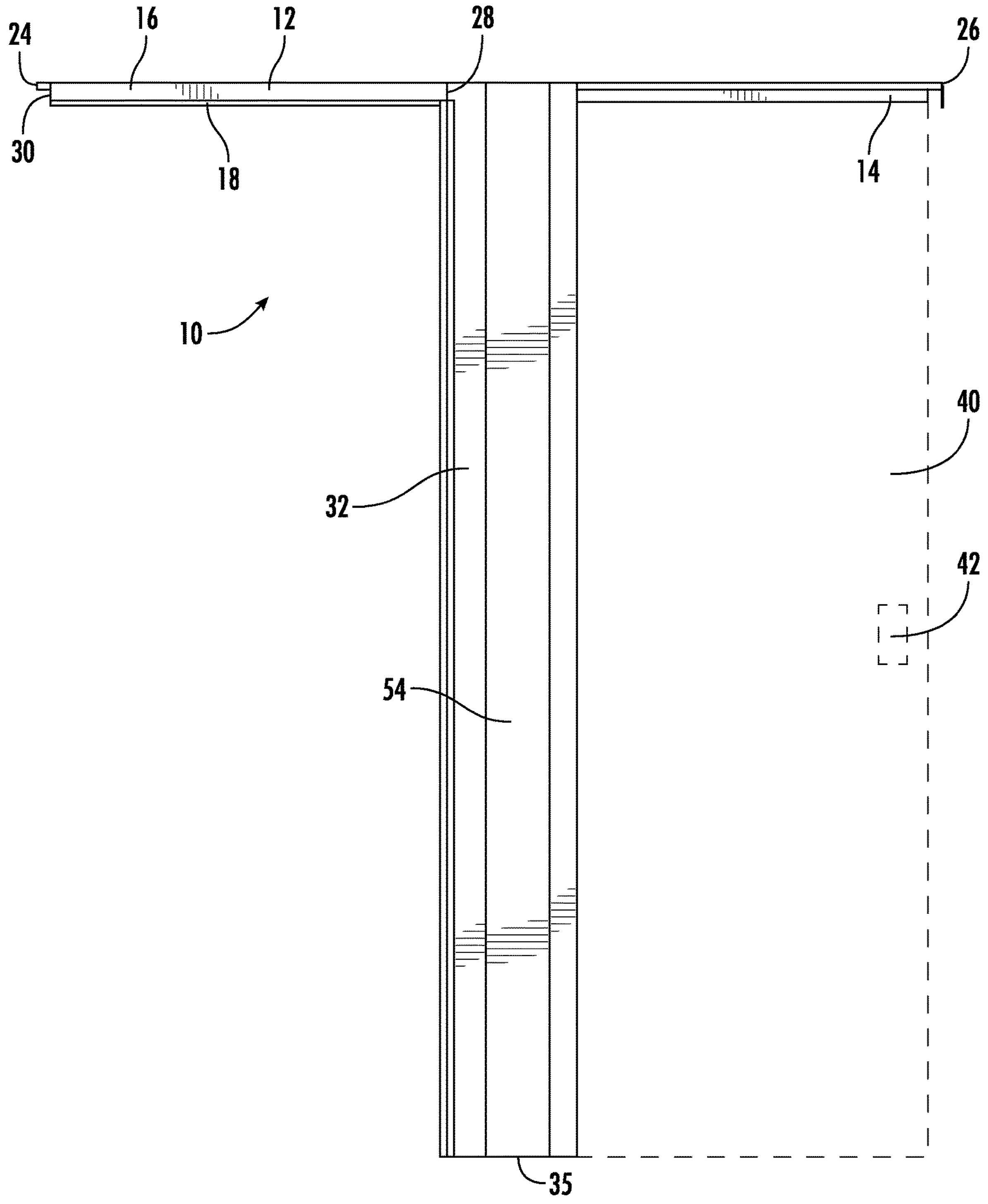
FIG. 3 is a side view thereof including a door on a sliding track.
Figure 4:
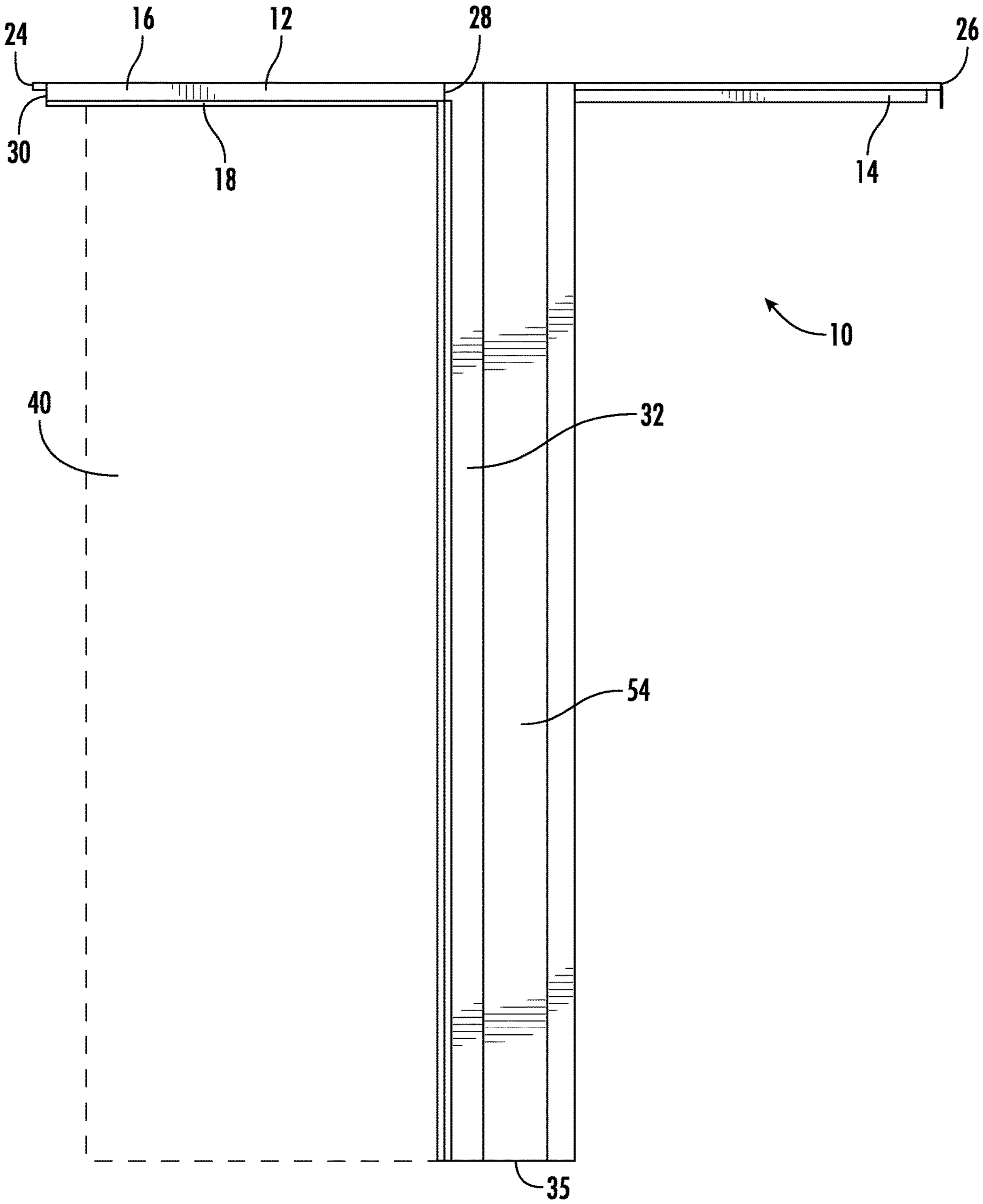
FIG. 4 is a side view thereof including the door on the sliding track relocated to the other side.
Figure 5:
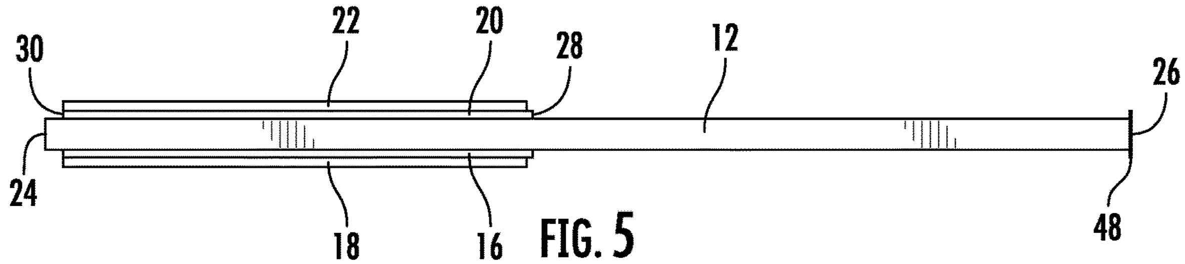
FIG. 5 is a top view of a header support.

The first and second vertical spreaders 32, 34 form a pocket recess entryway, or opening, constructed and arranged to receive a sliding door 40, shown in FIGS. 3 and 4. FIG. 3 shows the sliding door 40 secured to the track 14 wherein a user can pull the handle 42 in order to move the sliding door 40 along the track 14. FIG. 4 shows the sliding door 40 secured to the track 14 relocated to the other side, wherein the sliding door 40 may be pushed through the pocket recess entryway, or opening. The compact door frame assembly 10 is originally constructed with a plurality of door stop slats 44 each secured to the first vertical spread 32 and the second vertical spread 34 by a slat block 46 which covers the pocket recess entryway. During installation, both the door stop slats 44 and the slat blocks 46 are removed before inserting a sliding door 40 onto the track 14.

Figure 6A:
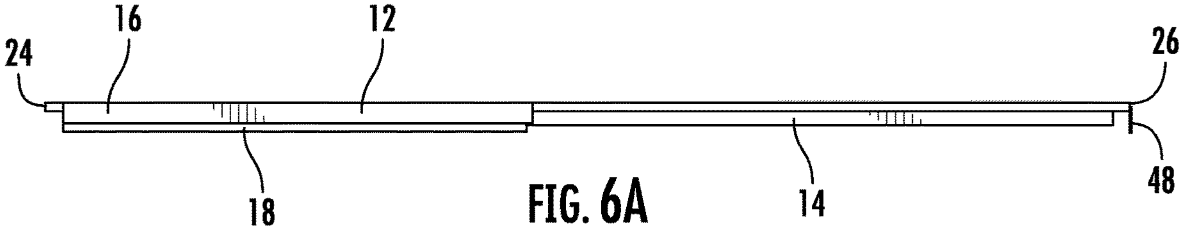
FIG. 6A is a side view of the header support.
Figure 6B:
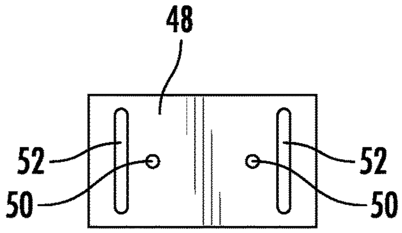
FIG. 6B is a front view of a metal endplate.

A metal endplate 48 is attached to the second end 26 of the header support 12 having a width measured between a first edge wall and a second edge wall. This width is defined by the region where the compact pocket door frame assembly 10 is installed between two drywall panels. The purpose of the metal endplate 48 is to provide structural support and stability to the compact pocket door frame assembly 10, in particular, with sagging and flexing of the frame assembly 10. A detailed view of the metal endplate 48 is shown in FIG. 6B. The metal endplate 48 includes screw holes 50 and cutouts 52 to properly align and secure the frame assembly 10 with screws or T-bolts during installation. Once properly installed, the metal endplate 48 helps maintain the integrity of the frame during the opening and closing of the sliding door 40.

Along the first side of the compact pocket door frame assembly 10 is placed a first plywood panel 54 positioned adjacent to the first vertical spreader 32 and extending from the base member 35 to the header support 12, the plywood being ⅛ inch thick and about 14 inches wide, and being attachable to the header support 12 by securing screws or T-bolts through the top of the first plywood panel 54. The second side has a second plywood panel 56 positioned adjacent to the second vertical spreader 34 and extending from the base member 35 to the header support 12, the plywood being ⅛ inch thick and about 14 inches wide and fastened to each of the horizontal slats 34 positioned on the second side, and being attachable to the header support 12 by securing screws or T-bolts through the top of the second plywood panel 56.

The combination of the vertical spreaders 32, 34 and the plywood panels 54, 56 are positioned about halfway along the length of the header support 12. The header support 12 is removably fastened to the vertical spreaders 32, 34 for shipping and storage whereby the header support 12 is secured to the vertical spreaders 32, 34 forming a T-shape structure for wall mounting to support a sliding door 40.

Figure 7A:
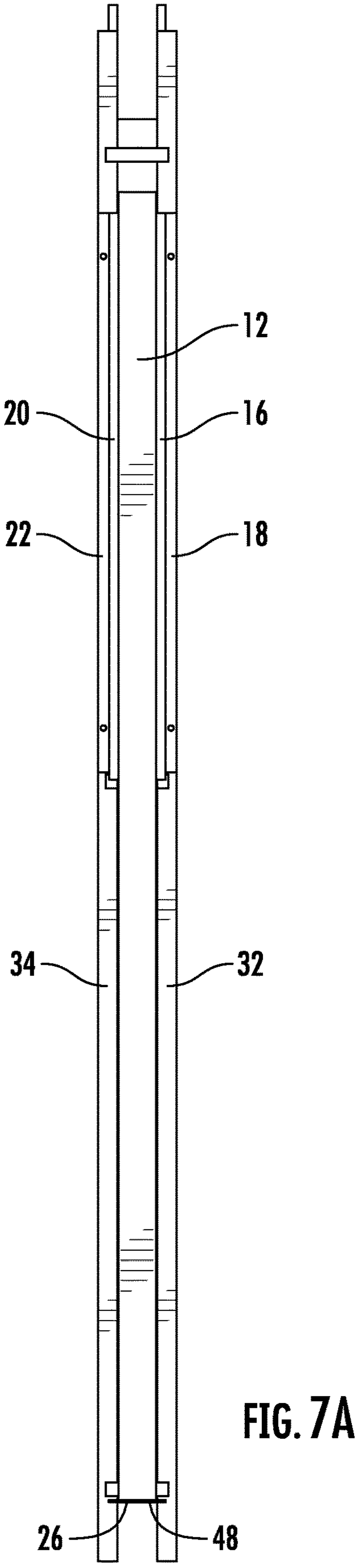
FIG. 7A is a side view of the frame assembly with the header support attached to the frame in a storage position.
Figure 7B:
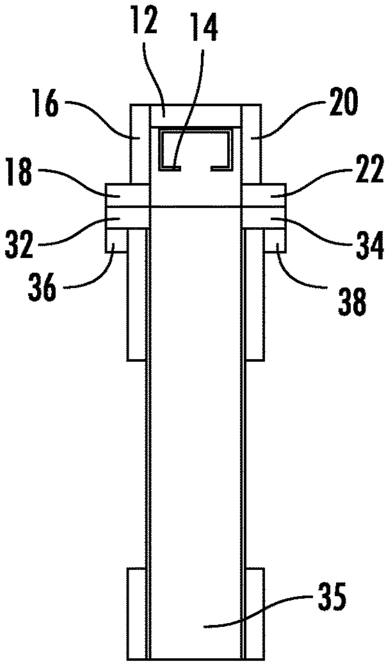
FIG. 7B is an end view thereof.
Figure 8:
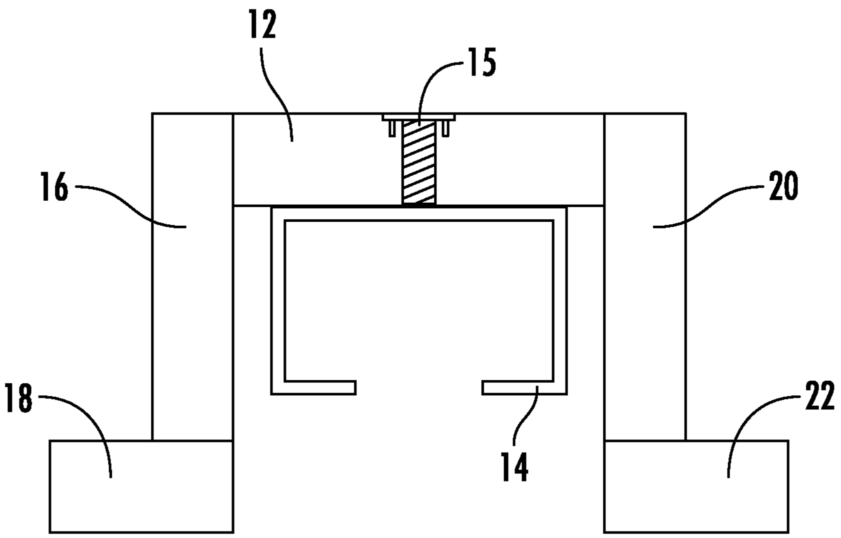
FIG. 8 is a cross-sectional view of the header support.
Figure 9:
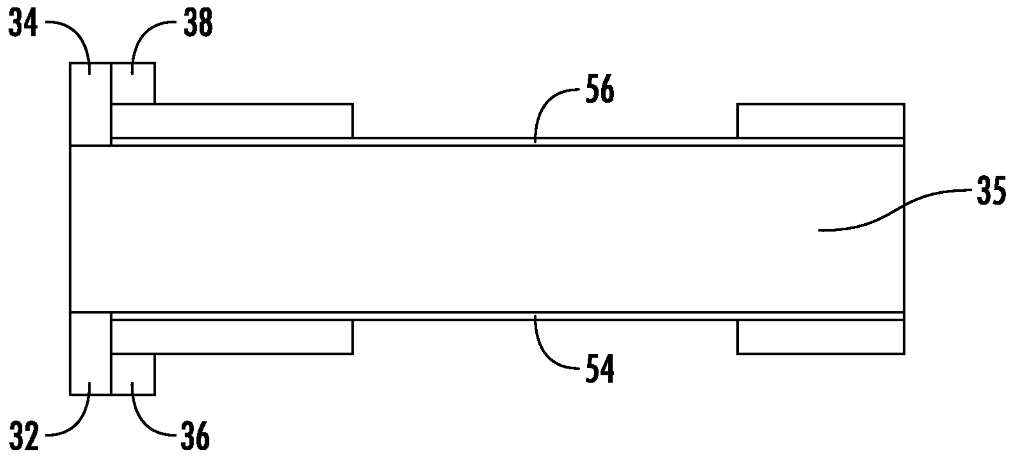
FIG. 9 is a bottom view of the compact pocket door frame assembly without the header support.

FIGS. 7A and 7B show the compact pocket door frame assembly 10 in a storage or shipping position. The present invention solves the issue of storage and shipping large door frame assemblies by allowing the entire length of the header support 12 to fit directly over and onto the vertical spreaders 32, 34, wherein the header support 12 is sized and shaped width-wise substantially similar to the distance between the first vertical spreader 32 and the second vertical spreader 34, allowing the entire frame assembly 10 to be stored or shipped neatly in one vertical container.

As shown in FIG. 7B, the edges of the header frame members 18, 22 meet the edges of the vertical spreaders 32, 34 and the pocket recess does not allow for interference with the track 14 or even the door stop slats 44 and slat blocks 46. The header support 12 can be secured to the vertical spreaders 32, 34 with screws or T-bolts during storage and shipping, which are later removed during installation. The screws or T-bolts can then be removed, making the header support 12 a stand-alone piece, and then placed, fit, and secured directly to the top surface of the vertical spreaders 32, 34 forming a T-shape structure for wall mounting to support a sliding door 40.

The term "about" means, in general, the stated value plus or minus 5%. The use of the word "a" or "an" when used in conjunction with the term "comprising" in the claims and/or the specification may mean "one," but it is also consistent with the meaning of "one or more" or "at least one." The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a method or device that "comprises," "has," "includes" or "contains" one or more steps or elements, possesses those one or more steps or elements, but is not limited to possessing only those one or more elements.

One skilled in the art will readily appreciate that the present invention is well adapted to carry out the objectives and obtain the ends and advantages mentioned, as well as those inherent therein. The embodiments, procedures and techniques described herein are presently representative of the preferred embodiments, are intended to be exemplary, and are not intended as limitations on the scope. Changes therein and other uses will occur to those skilled in the art which are encompassed within the spirit of the invention and are defined by the scope of the appended claims.

What is claimed is:

1. A compact pocket door frame for a sliding door comprising:

a header support having a first end and a second end forming a first length therebetween;

first and second header spacers having a proximal end and a distal end forming a second length shorter than said first length therebetween, said first and second header spacers secured to said header support and extending along said first length of said header support;

first and second header frame members secured to said first and second header spacers;

a track fastened to a lower surface of said header support and nested between said first and second header spacers and said first and second header frame members, said track constructed and arranged to support a sliding door movable between said first and second end of said header support;

a first vertical spreader spaced apart from a second vertical spreader by a first distance, each said first and second vertical spreader removably fastened, and extending from, said header support, and secured perpendicular to said proximal end of said first and second header spacers;

a base member having a front end and a back end forming a second length therebetween, said front end fastened to said first and second vertical spreader forming an opening sized to allow a sliding door to pass through said opening;

a metal endplate attached to said second end of said header support, said metal endplate having a width measured between a first edge wall and a second edge wall;

a first plywood panel positioned adjacent said first vertical spreader and extending from said base member to said header support and removably fastened to said header support;

a first base block extending between said base member and said header support, said first base block secured to said first vertical spreader;

a second plywood panel positioned adjacent said second vertical spreader and extending from said base member to said header support and removably fastened to said header support; and a second base block extending between said base member and said header support, said second base block secured to said second vertical spreader;

wherein said header support is removably fastened to said first and second vertical spreaders for compact shipping and storage whereby said header support is secured to said first and second vertical spreaders forming a T-shape structure for wall mounting to support a sliding door.

2. The compact pocket door frame according to claim 1 wherein said first and second vertical spreader is made from laminated 4 inch primed finger joint pine.

3. The compact pocket door frame according to claim 1 wherein the base member is made of ⅛ inch Polyethylene.

4. The compact pocket door frame according to claim 1 wherein said first plywood panel is 14 inches wide.

5. The compact pocket door frame according to claim 1 wherein said second plywood panel is 14 inches wide.

6. The compact pocket door frame according to claim 1 Wherein a pocket recess defined between said first and second header spacers and said first and second header frame members is at least 4⅝ inches wide.

7. The compact pocket door frame according to claim 1 wherein said metal endplate includes screw holes and cut-outs to properly align and secure the frame assembly with screws or T-bolts during installation.

8. The compact pocket door frame according to claim 1 wherein said track is mounted to said header support with T-bolt fasteners.

9. The compact pocket door frame according to claim 1 wherein said first vertical spreader and said second vertical spreader include a plurality of door stop slats therebetween each secured by a slat block which covers a pocket recess entryway.

10. A compact pocket door frame for a sliding door comprising:

a header support having a first end and a second end forming a first length therebetween;

first and second header spacers having a proximal end and a distal end forming a second length shorter than said first length therebetween, said first and second header spacers secured to said header support and extending along said first length of said header support;

first and second header frame members secured to said first and second header spacers;

a track fastened to a lower surface of said header support and nested between said first and second header spacers and said first and second header frame members, said track constructed and arranged to support a sliding door movable between said first and second end of said header support;

a first vertical spreader made of laminated ¾ inch primed finger joint pine spaced apart by 2¼ inches from a second vertical spreader made of laminated ¾ inch primed finger joint pine by a first distance, each said first and second vertical spreader removably fastened, and extending from, said header support, and secured perpendicular to said proximal end of said header spacers;

a base member having a front end and a back end forming a second length therebetween, said front end fastened to said first and second vertical spreader forming an opening sized to allow a sliding door to pass through said opening;

a metal endplate attached to said second end of said header support, said metal endplate having a width measured between a first edge wall and a second edge wall;

a first plywood panel having a thickness of ⅛ inch and a width of 14 inches positioned adjacent said first vertical spreader and extending from said base member to said header support and removably fastened to said header support;

a first base block extending between said base member and said header support, said first base block secured to said first vertical spreader;

a second plywood panel having a thickness of ⅛ inch and a width of 14 inches positioned adjacent said second vertical spreader and extending from said base member to said header support and removably fastened to said header support; and a second base block extending between said base member and said header support, said second base block secured to said second vertical spreader;

wherein said header support is removably fastened to said first and second vertical spreaders for compact shipping and storage whereby said header support is secured to said first and second vertical spreaders forming a T-shape structure for wall mounting to support a sliding door.

11. The compact pocket door frame according to claim 10 wherein the base member is made of ⅛ inch Polyethylene.

12. The compact pocket door frame according to claim 10 wherein a pocket recess defined between said first and second header spacers and said first and second header frame members is at least 4⅝ inches wide.

13. The compact pocket door frame according to claim 10 wherein said metal endplate includes screw holes and cut-outs to properly align and secure the frame assembly with screws or T-bolts during installation.

14. The compact pocket door frame according to claim 10 wherein said track is mounted to said header support with T-bolt fasteners.

15. The compact pocket door frame according to claim 10 wherein said first vertical spreader and said second vertical spreader include a plurality of door stop slats therebetween each secured by a slat block which covers a pocket recess entryway.

16. A compact pocket door frame for a sliding door comprising:

a header support having a first end and a second end forming a first length therebetween;

first and second header spacers having a proximal end and a distal end forming a second length shorter than said first length therebetween, said first and second header spacers secured to said header support and extending along said first length of said header support;

first and second header frame members secured to said first and second header spacers;

a track fastened to a lower surface of said header support and nested between said first and second header spacers and said first and second header frame members, said track constructed and arranged to support a sliding door movable between said first and second end of said header support;

a first vertical spreader made of laminated ¾ inch primed finger joint pine spaced apart by 2¼ inches from a second vertical spreader made of laminated ¾ inch primed finger joint pine by a first distance, each said first and second vertical spreader removably fastened, and extending from, said header support, and secured perpendicular to said proximal end of said first and second header spacers;

a base member made of ⅛ inch Polyethylene having a front end and a back end forming a second length therebetween, said front end fastened to said first and second vertical spreader forming an opening sized to allow a sliding door to pass through said opening;

a metal endplate attached to said second end of said header support, said metal endplate having a width measured between a first edge wall and a second edge wall;

a first plywood panel having a thickness of ⅛ inch and a width of 14 inches positioned adjacent said first vertical spreader and extending from said base member to said header support and removably fastened to said header support;

a first base block extending between said base member and said header support, said first base block secured to said first vertical spreader;

a second plywood panel having a thickness of ⅛ inch and a width of 14 inches positioned adjacent said second vertical spreader and extending from said base member to said header support and removably fastened to said header support; and a second base block extending between said base member and said header support, said second base block secured to said second vertical spreader;

wherein said header support is removably fastened to said first and second vertical spreaders for compact shipping and storage whereby said header support is secured to said first and second vertical spreaders forming a T-shape structure for wall mounting to support a sliding door.

17. The compact pocket door frame according to claim 16 wherein a pocket recess defined between said first and second header spacers and said first and second header frame members is at least 4⅝ inches wide.

18. The compact pocket door frame according to claim 16 wherein said metal endplate includes screw holes and cut-outs to properly align and secure the frame assembly with screws or T-bolts during installation.

19. The compact pocket door frame according to claim 16 wherein said track is mounted to said header support with T-bolt fasteners.

20. The compact pocket door frame according to claim 16 wherein said first vertical spreader and said second vertical spreader include a plurality of door stop slats therebetween each secured by a slat block which covers a pocket recess entryway.

* * * * *